United States Patent [19]

Crane et al.

[11] Patent Number: 5,023,845

[45] Date of Patent: Jun. 11, 1991

[54] EMBEDDED FIBER OPTIC BEAM DISPLACEMENT SENSOR

[75] Inventors: Roger M. Crane, Arnold; Eugene C. Fischer, Stevensville, both of Md.

[73] Assignee: The United States of America as represented by the Secretary of the Navy, Washington, D.C.

[21] Appl. No.: 264,734

[22] Filed: Oct. 31, 1988

[51] Int. Cl.$^5$ .............................................. G06F 15/20
[52] U.S. Cl. ...................................... 364/508; 73/800
[58] Field of Search ............... 364/508, 550, 525, 567; 73/768, 774, 800; 356/345; 250/227; 350/96.23

[56] References Cited

U.S. PATENT DOCUMENTS

| | | | |
|---|---|---|---|
| 3,940,608 | 2/1976 | Kissinger et al. | 250/227 |
| 4,346,600 | 8/1982 | Johnson et al. | 73/768 |
| 4,421,979 | 12/1983 | Asawa et al. | 73/800 |
| 4,484,480 | 1/1984 | Mucheyer | 73/862.64 |
| 4,572,949 | 2/1986 | Bowers et al. | 250/227 |
| 4,616,931 | 10/1986 | Studer | 356/373 |
| 4,624,570 | 11/1986 | Bertollini | 356/373 |
| 4,671,659 | 6/1987 | Rempt et al. | 356/358 |
| 4,674,882 | 6/1987 | Dorman et al. | 356/373 |
| 4,710,028 | 12/1987 | Grenier et al. | 356/375 |
| 4,734,577 | 3/1988 | Szuchy | 73/800 |
| 4,758,087 | 7/1988 | Hicks, Jr. | 250/227 |
| 4,795,232 | 1/1989 | Persson | 350/96.23 |
| 4,812,645 | 3/1989 | Griffiths | 73/800 |
| 4,836,639 | 6/1989 | Shamoto et al. | 350/96.23 |

OTHER PUBLICATIONS

Katsuyama et al; "Strain Measurement in Optical Cuble Using Resistance Wire"; Japanese Journal of Applied Physics, 1/1981.

*Primary Examiner*—Parshotam S. Lall
*Assistant Examiner*—Ellis B. Ramirez
*Attorney, Agent, or Firm*—Luther A. Marsh; John H. Stowe; Thomas S. O'Dwyer

[57] ABSTRACT

A method and apparatus for the two dimensional measurement of displacements of sample materials using a photodetector grid array and optical fiber embedded in the test specimen. The system consists of a light source which is passed into one end of an optical fiber which has been embedded a beam specimen, so that when the beam is placed in motion, the light traverses through the fiber and emerges from the opposite end where its projected image traces a pattern simulating that of the beam. In a preferred embodiment, the collimated exiting light is incident upon a light beam splitter which directs equal portions of the light toward a quadrant photovoltaic cell device and toward a charge couple device (CCD). The CCD is connected to an optoelectronic viewing device for initial calibration, display and monitoring. The photodetector array is connected to a translator/amplifier which increases the photocells' source currents and converts them to equivalent voltages for output to a digital data processing terminal. The processing terminal integrates all simultaneous measurements by vectorial resolution of the voltage related deflections' magnitude and direction.

14 Claims, 3 Drawing Sheets

EMBEDDED FIBER OPTIC BEAM DISPLACEMENT SENSOR

The invention described herein may be manufactured and used by or for the Government of the United States of America for governmental purposes without the payment of any royalties thereon or therefor.

BACKGROUND OF THE INVENTION

1. Field of the Invention

The present invention relates to a method and apparatus for measuring beam end displacements by determining the position of the beam cross section with time utilizing embedded optical fibers and a photodetector x-y grid sensor.

2. Description of the Prior Art

Damping loss factor determination for composite materials is currently conducted using a variety of sensors. The sensors are used to determine the displacement of the composite specimen during vibration as a function of time. Two of the more commonly used sensors for determining the displacement versus time information are the noncontact eddy current probe and the attached accelerometer. Both of these devices produce an electrical signal which can be related to a displacement.

There are two problems that are often overlooked when using these sensors. First, the analysis, using the equations of motion of a beam in bending, assumes certain conditions at the ends of the beam are known. Experimentally, it is assumed that the displacements are measured at the tip of the specimen. The sensors, however, cannot be positioned at the exact end of the test piece, but are instead located close to the end and do not therefore measure actual tip deflection. Secondly, these sensors detect displacements, or an acceleration, at a particular cross section of the specimen. The assumption made in the data reduction is that the cross section moves uniformly with one dimensional vibratory motion, i.e. that plane sections remain plane. This assumption is valid for certain materials, such as metals, which may be both homogenous and isotropic. However, for other materials, such as composites which can be fabricated with fibers oriented in many directions, this assumption will no longer suffice since bending-twisting couplings can arise which will result in two dimensional vibratory motion.

The recent advances in laser technology and optical fibers have been combined to offer a highly accurate method for measurement and testing. Optical fibers, which may be encased in various specialized jacket materials, have increasingly demonstrated their use as highly sensitive sensors. A large variety of fiber optic sensors are currently in use and include acoustic, magnetic, rate of rotation, acceleration, electric, electric current, trace vapor, pressure, and temperature sensors. They are being applied to hydrophones, magnetometers, gyroscopes, accelerometers, spectrophones, communication cables, and many other devices. These devices exhibit numerous advantages, the most important of which are geometric flexibility, immunity to electromagnetic pulses, large bandwidth, and great sensitivity, i.e. ability to detect extremely low signal levels and small signal level changes. Although many fiber optic systems are currently under investigation, the two types of fiber optic sensors of relevance, are either phase modulated or intensity modulated sensor devices.

The phase modulated applications depend primarily upon force field induced length changes and strain induced refractive index changes which causes transduction, or phase shifting, as the lightwave travels throughout the sensing length of the optical fiber and which can be detected using an interferometer apparatus. A spiral array of optic fiber wound around a mandrel and interferometry has been used to sense stress waves (acoustic emission and ultrasound) within transparent materials. Others have used similar lengths of single mode fiber in both the signal and reference arms of a Mach-Zehnder interferometer for the detection of ultrasonic waves in solids. A rectangular grid array of 50 individual fibers, arranged to give 10 mm. squares, has been described to determine the two dimensional stress distribution produced by the point loading of a simply supported square plate. Each of the fibers in this array yielded a measurement of stress integrated along the fiber length which when plotted on an x-y normalized stress graph indicated the position of any stress concentration. A monomode optical fiber interferometer which detects interference between light reflected from the end face of the fiber and light reflected back to the surface from a vibrating surface has also been described. An evanescent wave coupler was used to balance the light levels between fibers and to divert the return beam to a photodetector. Surface displacements of as small as 5 nm. were measured in this manner. Still others have demonstrated a fiber optic strain gauge using change in the optical path length due to the deformation of a fringe which results when the reference and signal beams are combined to produce interference patterns. When this strain gauge was applied to the surface of 300 mm. long by 5 mm. thick cantilever beam, a displacement of 10.28 m. was indicated by one fringe.

All of the above described configurations are applications of the phase modulated type sensor and represent primary measurement devices. The electric current and trace vapor sensors are also of this same type but are secondary devices in that they rely on the measurement of the magnetic field or the temperature in the former case and the sound associated with the absorption of light in the latter case. Phase modulated fiber optic sensors may thus be characterized by their required use of coherent light sources, single mode fibers, and relatively complex optical and electronic circuitry.

The intensity modulated type fiber optic sensors, on the other hand, depend primarily on an optical source of constant intensity which is ordinarily acted upon by an external force field so as to modulate the output light intensity incident on the photodetector, thereby modulating the output voltage of the photodetector. A conceptually simple use of an intensity type sensor is an application wherein the optical fiber is adhered directly to the surface of the specimen. This configuration may be used to detect fracture by being broken when the adjacent crack develops. The break can be detected either at the point of the light emission from the open fractured optical fiber end, or may be detected at a location remote from the break by monitoring the attenuation of the light level. Others have used the transit time of a circulating light pulse in long multimode optical fiber to measure the absolute length of the fiber and its length variations. This system operates as a transit-time oscillator and was proposed for use in a digital read out fiber optic strain gauge. An interferometric optical fiber strain measurement technique has also been described wherein the emphasis on the work is on remote measurement of slowly varying microstrains. This device is read by a frequency modulated laser source and is compatible with passive sensor multiplexing. The reference against which the mechanical displacement is measured is the modulation frequency rather than the optical frequency. The potential resolution of mechanical displacement using this device is 10 nm.

All of the above described applications of the intensity modulated type sensor may be characterized by their employment of relatively simple optics and circuitry. An incoherent optical source, such as a light emitting diode (LED) or a high intensity incandescent source may be used, together with one or two multimode fibers as links between the sensor, the modulating element and the detector. While all of these devices have the advantage of being much simpler in design and operation, they are however, less sensitive than the phase modulated fiber optic sensors. Achievable sensitivities, expressed in terms of minimum detectable displacements for intensity type mechanical motion sensors, lie in the order of $10^{-10}$ to $10^{-7}$ m., as compared to a lower limit of $10^{-14}$ m. achievable with the phase modulated type fiber optic sensors.

SUMMARY OF THE INVENTION

A new testing technique has been conceptualized and validated which utilizes optical fibers embedded in the test specimen and a photodetector grid as the sensors. The system of the present invention is capable of measuring deflection in two dimensions and consists of a coherent laser beam, infrared, or other incoherent light source which is passed into one end of an optical fiber which has been embedded in a sample beam specimen. When the beam is placed into motion, the light traverses through the fiber and emerges from the opposite end, where it impinges upon a photodetector grid sensor. This sensor consists of an x-y square planar matrix, such as a quadrant photovoltaic cell device, which is sensitive to and is activated by, the frequency of the light incident thereon. The photovoltaic source currents are amplified and translated to voltages for output transmission to a digital data processing terminal. The processing terminal integrates all simultaneous field measurements by vectorial resolution of the voltage related deflections' direction and magnitude and generates displacement versus time data. This latter information is then used to determine the damping loss factor and other physical properties of the beam sample material. In the preferred embodiment, a beam splitter is additionally introduced into this system at the position whereat the light exits the beam end for deflection of equal portions of the incident light to the photodetector and to a charge couple device (CCD). The CCD signal is relayed to an optoelectronic viewing device for initial calibration, display and monitoring.

Accordingly, one object of the present invention is to provide a system for the testing and measurement of two dimensional vibration motion in a beam specimen when subjected to a bending moment.

Another object of the invention is to provide a method for determining the damping loss factor of suitable sample materials, including composite laminate materials with off axis and angle ply fiber orientations.

A further object of the invention is to provide a method for determination of two dimensional beam vibratory motion which will help to explain the mechanisms by which energy is being dissipated through the bending-twisting coupling motion that occurs when off axis composite laminates are subjected to a dynamic bending displacement so as to lead to design practices which would optimize this energy dissipation and/or lead to active control systems for elimination of residual displacements.

DETAILED DESCRIPTION OF THE INVENTION

Figure 1:
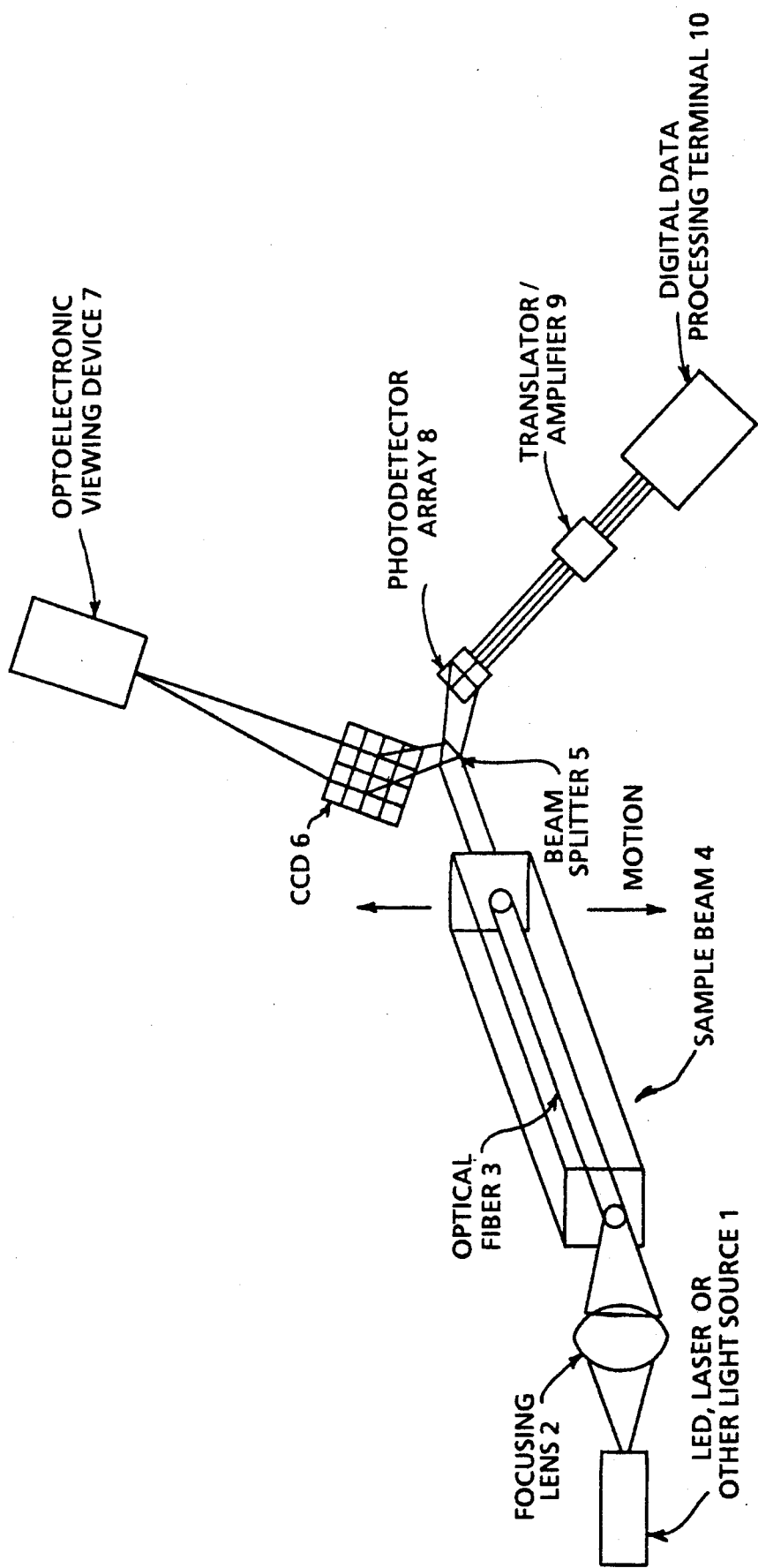
FIG. 1 is a schematic illustration of the arrangement of the various components which comprise the system of the present invention.

The invention now will be described in detail, in conjunction with the accompanying drawings, wherein like reference characters designate identical or corresponding parts throughout the several views. For the purpose of teaching at least one use of the present invention, it should be understood that composite materials can be fabricated with fibers oriented in many directions. Two generic fiber orientations for composites are off-axis and angle ply. In the off-axis case, the fiber orientation is all in one direction, such as 20 degrees, from the loading axis. In the angle ply configuration, the fiber orientation is, for example, plus and minus 20 degrees from the loading axis. As a result of the fiber orientations, stress couplings can occur. These may include a stretching-shearing coupling, a twisting-stretching coupling, a bending-twisting coupling and a bending-stretching coupling.

In vibration testing, the composite material is subjected to a bending moment. If the material has a laminate configuration which has either a bending-stretching or a bending-twisting coupling, the damping loss factor for the material is a combination of the material's loss factor as well as the contribution from the loss due to the stress coupling from that particular configuration. The configuration of a composite has been shown experimentally to effect the materials damping loss factor. R. Adams and D. Bacon in "Effect of Fibre Orientation and Laminate Geometry on the Dynamic Properties of CFRP", Journal of Composite Materials, Vol. 7, October 1973, at pgs. 402–428, have determined the damping loss factor of angle ply (±0) and off-axis (+0) graphite/epoxy composite materials. They show that the maximum in the loss factor occurs at different angles for the angle ply and off-axis samples. In addition, the rate at which the magnitude of the loss factor increases are significantly different in the two cases.

When a composite material is subjected to a bending moment in the x direction, a rotation in the xy direction results if the D inverse matrix has a $D^{-1}{}_{16}$ (bending-twisting coupling) term. In the case of an off-axis laminate, this term exists and is in the range of 0–0.06 lb. in. The extent of the twist is dependent on the magnitude of the $D^{-1}{}_{16}$ term. The maximum in the magnitude of this twist term, as a function of ply angle, occurs at approximately a 30 degree angle for a 12 ply graphite/epoxy off-axis laminate. This angle corresponds directly to the orientation at which the maximum in the damping loss factor is reached as determined by Adams and Bacon for an off-axis material. This suggests that the rotation which occurs in off-axis specimens during bending resulting from the bending-twisting coupling may be a mechanism of large energy dissipation. If the degree of twist and the bending-twisting coupling are experimentally determined for composite materials, then it will be possible to use the off-axis composite material specimens for determination of the effect of angle orientation on the damping loss factor. Accordingly, for the purpose of illustration, but not by way of limitation, the description of the present invention will be related to the case of a composite beam specimen set in vibratory motion.

In FIG. 1, a continuous light source 1 is used to introduce light into one end of the optical fiber 3 with the aid of a focusing lens 2. The light source 1 may be a coherent light such as a laser, or an incoherent light source such as a light emitting diode (LED), infrared or incandescent depending upon the wavelength sensitivity and frequency cutoff of the photodetector device 8 utilized therewith. Low power lasers are preferably used in this system for safety reasons and because their light intensity will not cause degradation of the photodetector's surface coating. The optical fiber 3, whose wavelength range is similarly selected to match that of the light source and the photodetector array, may be, for example, a small core single mode optical fiber having a diameter of 9 microns as made by Owens Corning (material designation SDSD3360726AA, 218449-10, 860202) which possesses a wavelength range around 1300 nm.

The optical fiber 3, may be embedded in the beam specimen at any location desired. However, by introducing a zero degree ply or film adhesive layer about the midplane of the beam and by placing a small diameter optical fiber in this plane, beam fiber distortion can be held at a minimum. Where the bending-twisting coupling is to be examined, for instance, the optical fiber could be placed at either extreme edge of this midplane ply. By incorporating either one or several optical fibers off center from the axis of the beam, a vibrational motion which is not one dimensional will result in the light exiting the beam tracing out an arc pattern on the photodetector grid array 8. In this manner, two dimensional vibratory motion can be determined.

Where one dimensional vibration in a composite sample beam 4 is sought to be examined, the most appropriate position to place the optical fiber 3 would be at the center of the midplane, or centroid of the sample. This is accomplished in the case of a T-300/5208 unidirectional prepreg graphite/epoxy, wherein 16 ply panels are fabricated with the configuration $20_8/0/20_8$ and $(+20/-20)_4/0/(-20/+20)_4$, representing an off-axis and angle ply material respectively, by placing the optical fiber in the 0 degree ply. The composite material is then cured using the manufacturers recommended cure cycle. After curing, the specimen is placed into a clamping device to hold it in place, obtaining a cantilever beam configuration.

The embedded optical fiber 3 terminates coincidently with the edge of the sample beam on one end and has a lead length extending out of the beam at the other end. The optical fiber lead end is held in place by a clamp which has a horizontal and vertical positioning capability. When light is propagated through the focusing lens 2 using, for example, a 5 milliwatt Helium-Neon laser, the optical fiber lead's position is adjusted until it has light passing through it in the form of a four lobe pattern. This lobe pattern is characteristically obtained when a monomode optical fiber is used and the maximum light intensity is reached.

Light exiting at the opposite end of the composite beam 4 becomes incident upon a photodetector array 8. The photodetector device is capable of extracting information from a lightwave by producing an electrical output signal which is proportional to that received from the optical input signal. By way of example, the photodetector grid sensor 8 may consist of a two dimensional square planar matrix, such as 2×2 quadrant photovoltaic cell device, which is sensitive to and is activated by, a wide bandwidth frequency of light. A photovoltaic cell develops a voltage across its terminals when illuminated thereby generating an electron current flow which is proportional to the incident light thereon. Acceptable photovoltaic cells for the present purpose can be solid state devices using either metal semiconductor contacts or PN junctions. The fact that photovoltaics are high impedance devices necessitates working with a current to voltage translator. The translator/amplifier 9 initially increases the photodetector array 8 signals for conversion, via the translator element, from current amplitudes to equivalent voltage amplitudes which may be further amplified. The amplified output voltages from the translator/amplifier 9 are then electrically transmitted to a digital data processing terminal 10 which integrates all simultaneous field measurements by vectorial resolution of the voltage related deflections' direction and magnitude and generates displacement versus time data. The extent of signal amplification required by component 9, is a level sufficient to mitigate the switching losses as may be inherent in the data processing terminal 10.

Optionally, as depicted in the preferred embodiment of FIG. 1, the light beam exiting the composite sample material 4 may be intercepted by a light beam splitter 5. This optical device has the function of dividing a light beam into two separate beams. One simple beam splitter consists of aligning the hypotenuse face of a 45°-90°-45° prism in the path of the exiting light beam. Care should be taken with this type of beam splitter to select a prism material which will match the transmitted and reflected beam for brightness and for color. Other acceptable beam splitter devices include a partially reflecting mirror and a plane parallel plate which has one surface coated with a dielectric or metallic coating. This latter type device reflects a portion and transmits a portion of the incident light, i.e. part of the light is diverted through an angle of 90° and part is unchanged in direction. The purpose of adding this element to the system is to bifurcate the beam of light exiting the composite material so as to simultaneously deviate a portion of the light onto the photodetector array 8 and a portion onto a charge couple device (CCD) 6 which, in turn, is connected to an optoelectronic viewing device 7.

The charge couple device (CCD) 6 and the optoelectronic display device 7, is useful for initial calibration, definition of the lobe pattern, determination of optical null and for visual monitoring of the ongoing experiment. The CCD 6 sensing element may, for example, be a General Electric solid state video/digital camera Model TN2500, consisting of a charge injection device (CID) imaging array sensor. The approximately 0.5 square inch CID consists of a two dimensional x-y square grid array of 512×512 coupled metal-oxide silicon capacitor optical detectors which collect and store the photo generated charge. This signal is then transmitted to an optoelectronic display device 7, such as a Model PN-2304 Optomation II Electron Vision System (a registered trademark of the General Electric Corporation), for signal interrogation. The image is visualized on a cathode ray tube (CRT) via the Optomation II system. The signal can then be optimized by varying the threshold and noise levels until a minimum area is obtained on the CRT.

With the system equipment set up, the composite sample beam 4 may be set into vibration by simply impacting it near the clamped end, by deflecting the beam a measured distance at its unsupported end, or by driving the beam at preselected forcing frequencies. It should be recognized, that the tip deflection will decrease with time after initial excitation if one uses the impact method for inducing beam vibrations. In the preferred embodiment shown in FIG. 1 therefore, the motion of light exiting the composite sample beam 4 through the monomode optical fiber 3, and which is bifurcated by the light beam splitter 5, is then incident on the CCD sensor 6 for display on the CRT 7 and incident on the photodetector array 8 for signal processing at 9 and data processing at terminal 10. Having described the above referenced system elements, several parametric aspects of fiber optic sensor imaging should now be discussed before the data acquisition and processing technique can be fully appreciated. These features include the fiber optic light spread, apparent deflection and the sensor sampling rate.

When the light source is not matched to the fiber optic wavelength range, or most notably, where an infrared or other incoherent light source is used, and the vibrating end of the optical fiber is separated from the photodetector by a finite distance, the light emerging from the fiber end spreads. The image that forms on the sensor is a circle, the diameter of which is given by the equation: $D = d + 2S \tan(\theta)$ where $D$ = image diameter, $d$ = optical fiber core diameter, $S$ = sensor distance from the optical fiber end, and $\theta$ = the optical fiber's acceptance cone half-angle. $\theta$ is related to the fiber's numerical aperture, NA, by the expression: $\theta = \sin^{-1}(NA)$. For this application, the possible range of all the variables and its associated limits are given in the Parameters table of FIG. 2. Also given in that table are the calculated maximum and minimum image diameters using the above equation.

The maximum tip deflection that the beam will normally be subjected for vibration damping loss factor determination will be in the range of 0.0005 to 0.009 inches. The reason that the displacements are usually kept to this minimal level is that typically, testing is conducted in air and it has been shown that aerodynamic damping can be a major contributor to the material damping loss factor as can friction loss at the clamp of the cantilever beam in tests where displacements become large. Comparing this deflection range to the range of image diameters given in the Parameters table of FIG. 2, it is seen that the image diameter is at one extreme on the same order order of magnitude as the tip deflection and the at other, two orders of magnitude greater. To insure accurate vectorial resolution of the light induced currents, the light beam should at all times be incident upon at least two quadrant cells of the photodetector.

For a quarter inch sensor distance, the calculated image diameter of approximately one third of an inch allows for sufficient light spread to be within the distinguishing capabilities of current solid state photodetector array's. At first, it would appear that this relationship with image diameter could be used to enhance the measurement technique by increasing the distance of the sensor to the end of the beam. However, the limiting constraints in this regard are that the image diameter cannot exceed the physical dimensions of the photodetector array considering displacement and the affect of apparent deflection, to be discussed infra. Thus, if it were necessary to achieve large sensor distances, as may be the case with the arrangement shown in FIG. 1 wherein an optoelectronic display terminal 7 is included, another focusing lens similar to piece 2 would have to be introduced whereat an incoherent light emerges from the vibrating beam for refocusing the light onto the beam splitter 5. It should be noted that the size of the image can also be controlled, for either a coherent or an incoherent light source, by attaching to the embedded fiber a graded index (GRIN) lens or by etching the embedded fiber end with an acid, such as hydrofluoric, either of which function to collimate the exiting light. The acid etching treatment has proved of great benefit in narrowing the light spread of the projected image as sensor distance is increased and obviates the need, in most cases, for a second focusing lens.

When a beam is subjected to a vibratory motion, its slope from its clamped end will vary. As a result of the slope change and the fact that the photodetector and beam are separated, the deflection, measured from the position of incident light on the sensor, will be translated with respect to the actual tip deflection. This apparent deflection, derived from geometric considerations and shown as an insert in FIG. 2, is given by the equation:

$$\Delta_{ap} = \Delta + S \tan(\Phi)$$

where $\Delta_{ap}$ = apparent deflection at the sensor, $\Delta$ = actual deflection of the beam tip, $S$ = sensor distance, and $\Phi$ = slope of the beam. It should be noted that the Parameters in the FIG. 2 graph were selected so as to result in the smallest image diameter.

Figures 2, 2A:
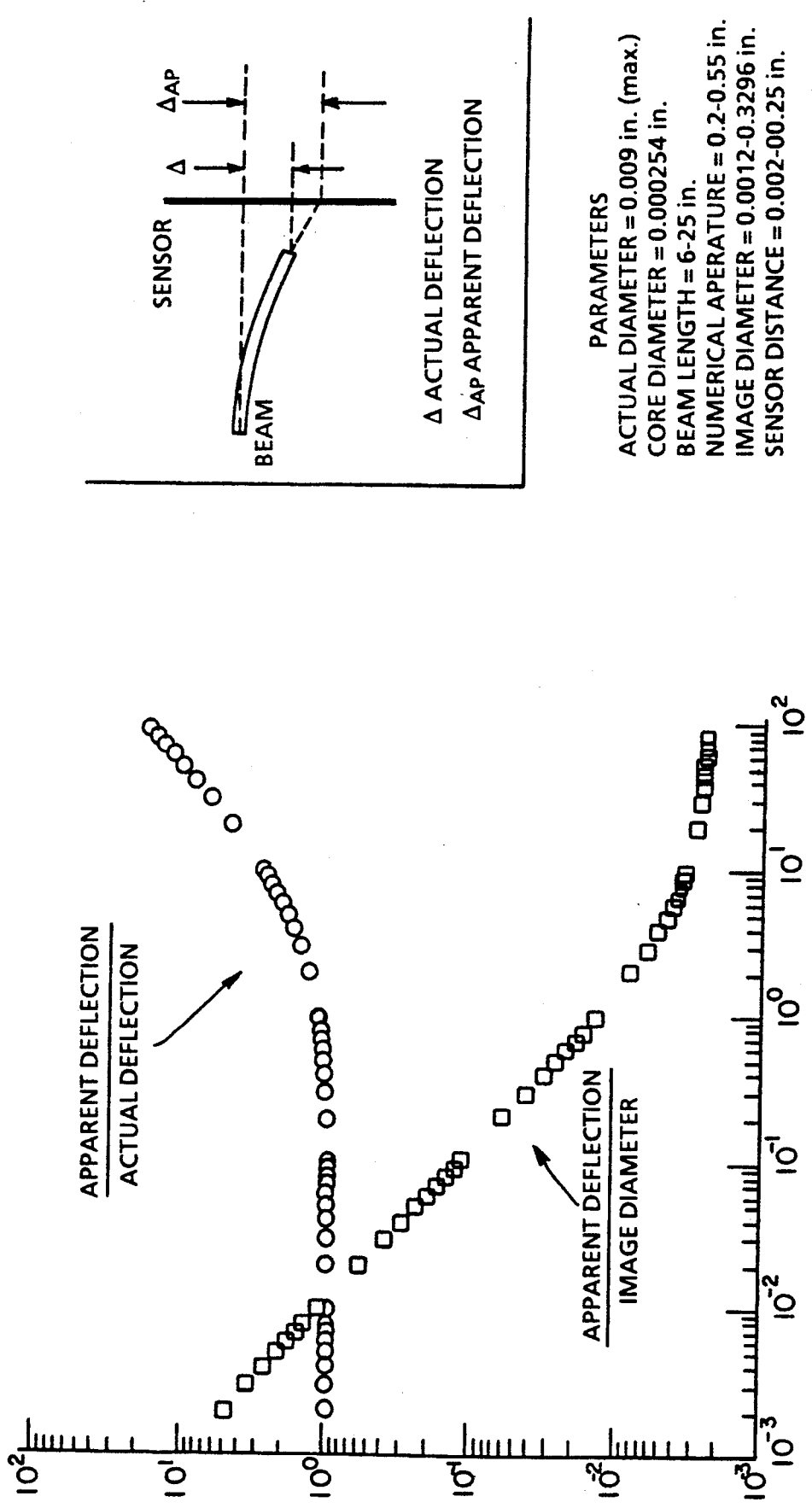
FIG. 2 is a graph of the apparent deflection (insert) as a function of photodetector sensor distance normalized as the ratios of apparent deflection to actual deflection and apparent deflection to image diameter.

In order to determine the total effect of increasing the distance of the beam end to the photodetector, the ratio of the apparent deflection to the actual deflection and the ratio of the apparent deflection to the image diameter was determined and is plotted in FIG. 2. The FIG. 2 graph shows that although the actual deflection is translated, the apparent deflection ratio is in a one to one relationship and is without significant effect until the sensor distance is held beyond approximately one-half inch from the vibrating end of the beam. In fact, FIG. 2 shows that the most accurate data will occur at very small sensor distances. For instance, from FIG. 2, for a sensor placed at a distance of four inches from the end of the beam, an apparent deflection will be seen by the photodetector which 1.75 times the actual displacement. Similarly, for a sensor distance of ten inches, this translation is 3 orders of magnitude larger than the actual deflection. Therefore, when sensor distances are greater than one-half inch, apparent deflection must be numerically compensated for by the data processing terminal 10 when the voltage readings are transmitted to it by the translator/amplifier 9 for initial association with a displacement.

On the other hand, even when held to a minimum, the FIG. 2 graph shows that image diameter increases with distance at a much faster rate than the apparent deflection, and is therefore considered to be the dominant factor. In this respect, it should be recalled from our previous discussion regarding light spread and image diameter, that this limitation can be overcome by using a second focusing lens or by acid etching the embedded optical fiber end so as to collimate the light exiting the beam specimen.

Distortion of the projected circular image, which can occur if the longitudinal axis of the optical fiber is not normal to the plane of the sensor, was examined as well. Briefly, because the relationship between loading, deflection and slope of a composite beam is quite complicated, especially for unbalanced and/or nonsymmetric laminates, as a beam is subjected to a load normal to the plane of the sample material, it will deflect with a particular slope dependent on various material characteristics. The image that results is an ellipse. Defining distortion as the difference between the length of the major axis of the ellipse and diameter of the circular image from the optical fiber in its unloaded position, a parametric evaluation was performed for a worst case situation from the range of values for the core diameter, beam length, sensor distance, maximum tip displacement, and numerical aperture as given in the FIG. 2 Table. Comparison between the calculated distorted image axis and the stationary image diameter determined that fiber distortion due to bending of the beam was negligible for these test conditions wherein deflections are held to be relatively small.

Another critical part of this test procedure is the ability to obtain information from the photodetector fast enough to perform accurate measurements. The required sampling rate must be greater than at least twice the frequency of the highest harmonic to prevent aliasing errors. The frequency range of vibratory modes in composite beams is between 50-2000 Hz although typical values of interest tend to be low amplitude vibration in the range of 90-1000 Hz. To provide sufficient discrimination, a sampling rate of approximately 12 points per cycle is required. Thus, in this case, a data acquisition rate of 12 points/cycle times 2000 cycles/second or 24,000 points per second is probably necessary. This means that for the entire sensor grid, consisting of four quadrants, to be interrogated in parallel would require 96,000 point/second scanning capability which is easily provided by present 250 kHz digital data acquisition board hardware.

With low power lasers, as the output variations from the photodetector quadrants are relatively small, on the order of a microamperes, fluctuations are discernable only when amplifiers 9 are used to boost these signals to a level suitable for digitizing by the data processing terminal 10. The processing terminal digitizes each data point into an eight bit word so that each one of the twelve sample points gathered per cycle from each photodetector quadrant is allocated a $2^8$ space for determining the instant voltage and associating a deflection therewith. Vectorial analysis subroutines, to be discussed, are then utilized to resolve the four individual quadrant inputs and determine actual beam displacement magnitude and direction.

Figure 3A:
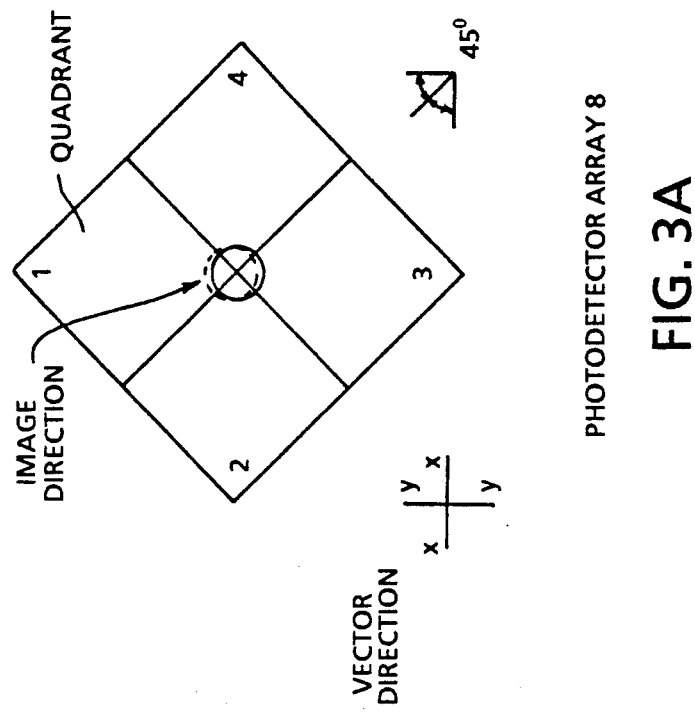
FIG. 3 is a series of sample point graphs representing the incremental change in voltages with respect to time concurrently reported from each quadrant of the photodetector device (insert) to the digital data processing terminal by way of the translator/amplifier for a typical vibration cycle.
Figure 3:
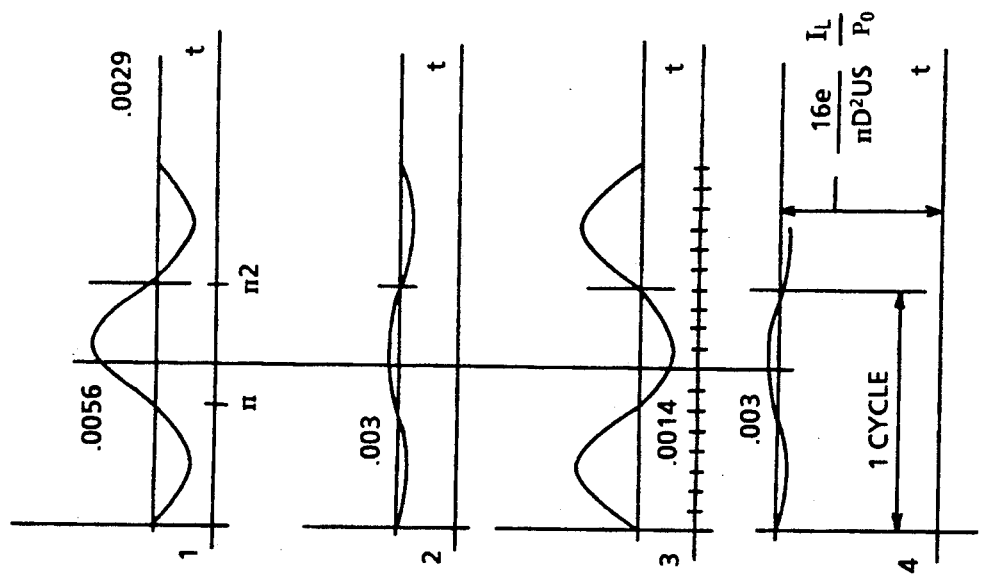

Referring now to FIG. 3, an image displacement is depicted on a two dimensional quadrant photovoltaic device 8 as a dashed line circumference. For ease of explanation, it is assumed that deflection is in the vertical direction only. It should be be reiterated here, that photovoltaic cells develop a voltage potential, with attendant current flow, which is proportional to the amount of illumination present in the quadrant. By initial calibration and/or calculation, one knows the voltage level of the centered light beam in each quadrant to be equal to one-quarter of the total incident light or $$\frac{16e}{\pi D^2 us} \frac{I_L}{p_o}$$

where $I_L$=the light flux, u=a constant ($\pm 40$ ev$^{-1}$), s=the surface recombination velocity, $p_o$=the density of holes in the dark photoconductor, D=image diameter, and e=system efficiency (based on light source and optical fiber matching, the presence of a focusing lens and of a light beam splitter, the degree of amplification, translator circuitry losses, and other related factors). Thus, a change in the light level received by the various photodetector quadrants, as when the beam undergoes vibratory motion, will result in a variation in the induced currents. The translator element of component 9 then converts these source ampere signals to equivalent voltage signals for output to the data processing terminal 10.

The photodetector array as herein utilized, therefore becomes an analog device by optically exciting electrons which convert changes in light intensity to proportional changes in electrical voltage. During initial calibration, voltages are measured for given deflections of the composite sample beam 4 so as to determine a scaling factor by which the voltage variations are directly convertible to associated displacements. As circular sector image varies radially, the scaling factor is piece wise linear over small deflections of the periphery with respect to the image diameter. This same scaling factor is also used to correct for image translation due to the effect of apparent deflection based upon sensor distance. In the case of strictly vertical vibration, motion is in the y direction and traverses the center of the device which will generate a zero based set of vectors. Vector resolution of the respective quadrant output variations, wherein associated displacements are initially assumed to be in the direction of the principal x-y axes, is simplified if the photodetector device is rotated 45° as shown in FIG. 3. The amplified voltage output responses for a typical vibratory motion through one and a half complete cycles with respect to time as received by the processing terminal 10 from the translator/amplifier 9 are also represented in FIG. 3 for each of the four photodetector 8 quadrants. While all quadrant waveforms are sinusoidal for an assumed vertical displacement, it should be observed that quadrants 2 and 4 are in phase with equal voltage amplitudes and that quadrants 1 and 3 have equal voltage amplitudes but are 180° out of phase. Obviously, the degree of signal amplification required to overcome the switching losses at the data processing terminal 10 must be accomplished by the amplifier element of component 9 with a negligible phase shift over the frequency range of interest.

If care is taken during calibration to align the center of the light beam exiting the optical fiber or optionally, the center of the light portion exiting the light beam splitter, with the intersection of the photodetector target grid array axes, a similar initial reading will be obtained from all four of the quadrants. By way of example, assume that this initial voltage reading is 0.0029 volts as represented in the FIG. 3 graph of voltage outputs as the threshold value. Optical null and the image center is then established by associating a set of initial condition vectors with each quadrant's circumferential value dependent upon the particular scaling factor involved, such as 0.4655, which results in $Q_1=(0, -0.00135)$, $Q_2=(-0.00135, 0)$, $Q_3=(0, 0.00135)$ and $Q_4=(0.00135, 0)$. This defines a circular image whose diameter is 0.0027 inch. With small deflections, the locus of beam image movements will be about the origin and is discernable at the peripheral circumference.

At a single point in time, the image displacement shown on the photodetector array 8 in FIG. 3 will result in four simultaneous voltage outputs. These readings are indicated by a single vertical line which traverses the four respective quadrant voltage graphs in FIG. 3. The voltage reading in quadrant one of 0.0056 volts, obtained by way of the translator/amplifier 9, is associated with a displacement, via the scaling factor, of 0.002. Likewise, the voltage reading in quadrant three of 0.0014 volts is associated with a displacement, via the scaling factor, by the data processing terminal 10, of 0.0007. Sample points are then converted to coordinates and are initially assigned vector directions. In this case, quadrant one and quadrant three vectors would become $V_1=(0, -0.002)$ and $V_3=(0, 0.0007)$. The direction of these vectors is determined by the following direction numbers $L=x_2-x_1$, $M=y_2-y_1$; the distance between the two points $d=\sqrt{L^2+M^2}$; and the direction cosine formulas:

$$\alpha = \arccos(L/d)$$

$$\beta = \arccos(M/d)$$

where $\alpha$=the angle between the vector and the x axis and $\beta$=the angle between the vector and the y axis. In this case, $L=0$, $M=0.0027$ and $d=0.0027$. Therefore, $\alpha=90°$ and $\beta=0°$ meaning that the displacement is indeed along the y axis and is directed toward quadrant one. The voltage inputs from quadrants two and four have equal value for a vertical displacement, would be assigned opposite directions, and therefore would cancel each other in this operation. The absolute magnitude of the vector associated with quadrant one is determined by the formula: $V=\sqrt{x^2+y^2}$ or, namely, 0.002 in this case. To find the magnitude of the actual displacement in the y direction, vector subtraction is used with origin data and is determined by the formula: $Q_1-V_1=(x_1-x_2, y_1-y_2)=(0-0, -0.00135-(-0.002))$, or $(0, 0.00065)$ in this case. This displacement is consistent with the quadrant three data utilizing the latter formula for $Q_3-V_3$.

In the case of a bending-twisting coupling where the displacement is accompanied by out of plane bending, the respective quadrant voltage analogs would be out of phase. That is, the incremental voltage readings in individual quadrants, which is directly related to the deflection of the beam in that quadrant, result in respective sample point waveforms that are not necessarily coincident. Therefore, after the four incremental voltage readings are initially associated with a displacement, respective vector magnitudes and directions are calculated and all quadrant vectors resolved vertically and horizontally. This operation is accomplished in three steps for a quadrant cell device and results in a vector with a single magnitude and direction from which, by reference to original conditions, the actual deflection obtained. Since the frequency (in cycles/second) of the output voltage is also directly related to the frequency of the beam vibration, the magnitude of the deflections may be displayed in real time as displacement versus time information. Data in this form is of importance because one method used to calculate the damping loss factor of a beam requires determination of tip deflection versus time information. A Fast Fourier Transform (FFT) is performed on this discrete data to convert it to amplitude versus frequency information. Using the half power band width method, as taught for instance by Ralph E. Blake, "Basic Vibration Theory", *Shock and Vibration Handbook*, (McGraw-Hill, 1976) at pgs. 2-15, the damping loss factor of the composite sample material is then determined.

The system hereinbefore described, utilizing fiber optics embedded in a beam specimen, has a number of distinct advantages in both measurement sensitivity and operation. First, although an optical fiber is embedded into the specimen to be tested, the fiber does not significantly affect the mechanical characteristics of the sample material nor does it concentrate mass at a particular location along the beam length as is the case with an attached accelerometer. This is because the optical fiber is of a small core diameter which is axially aligned and which itself may be selected from carbon, aramid, glass or other material so as to closely match the structural properties of the beam specimen into which it is embedded. Secondly, the optical fiber may be embedded in any curable, moldable or laminated sample material. Suitable beam specimens include concrete, wood, rubber, plastics, composites and the like sample materials which permit the placement, without destruction, of an optical fiber therein during the forming process. Thirdly, the displacements that are measured are from light that exits the end of the fiber. This means that the displacements measured are actually tip deflections, the theoretical results of which have yet to be confirmed in cantilever beam experiments. Finally, the system equipment may flexibly be arranged to support the optical fiber's inclusion which embedment may be at any location in the beam specimen. For example, by positioning two or more optical fibers into a composite sample, each targeting a requisite photodetector grid array, vibratory motion of one beam position relative to another can be determined. This equipment arrangement quantifies the out-of-plane bending and torsional rotation occurring due to bending moment couples about the primary axis. This is accomplished without the necessity of assuming equal and opposite displacement about the midplane of the beam. Herein, when one sample of vectors are resolved, the next resolved vector can be used to compute angular velocity and, if desired, angular acceleration therefrom.

Therefore, while this disclosure has addressed the use of embedded fiber optic sensors in a system for tip displacement measurements in composite beam vibration damping experiments, obviously many modifications and variations of the present invention are possible in light of the above teaching. Thus, it is to be understood that within the scope of the appended claims, the invention may be practiced otherwise than as specifically described.

What is claimed is:

1. An apparatus for measuring motion of a beam having an optical fiber embedded therein, comprising:

means for generating and injecting light energy into a first end of said embedded optical fiber;

a photodetector grid array having a plurality of segments, each segment of said array positioned to receive a different portion of a light beam emanating from a second end of said optical fiber, said array adapted to produce electrical signals identifiable to the amount of light reaching each said segment;

amplifier means for increasing the magnitude of said electrical signals;

a light beam splitter operative to sample said emanating light beam;

means for monitoring said light beam sample, said means for monitoring adapted to provide a visual representation of the impingement pattern of said light beam upon said grid array; and a data processing terminal for receiving amplified electrical signals and resolving said amplified electrical signals into a system of vectors such that motion magnitude and direction of said beam are determined.

2. An apparatus as claimed in claim 1 wherein said means for monitoring further comprises:

a charge coupled device for converting said light beam sample into electrical signals;

an optoelectronic viewing device for converting said electrical signals into a visual representation of the position of said light beam on said grid array.

3. An apparatus as claims in claim 2 wherein the number of segments in said photodetector grid array is four.

4. An apparatus for measuring relative motion of diverse points on a beam having a plurality of optical fibers embedded therein, comprising:

means for generating and injecting light energy into a first end of each said embedded optical fiber;

a plurality of photodetector grid arrays, each said array having a plurality of segments, each segment of each said array positioned to receive a different portion of a light beam emanating from a second end of each said optical fiber, each said array adapted to produce electrical signals identifiable to the amount of light reaching each said segment, each said array identifiable to one said optical fiber;

amplifier means for increasing the magnitude of said electrical signals;

a light beam splitter operative to sample each said emanating light beam;

means for monitoring each said light beam sample, said means for monitoring adapted to provide a visual representation the impingement pattern of said light beam upon said grid array; and a data processing terminal for receiving amplified electrical signals and resolving said amplified electrical signals into a system of vectors such that relative motion magnitude and direction of diverse parts of said beam are determined.

5. An apparatus as claimed in claim 4 further comprising:

a charge coupled device for converting each said light beam sample into electrical signals;

an optoelectronic viewing device for converting said electrical signals into a visual representation of the position of each said light beam on each said grid array.

6. An apparatus as claimed in claim 5 wherein the number of segments in each said photodetector array is four.

7. A method for measuring motion of a beam, comprising:

embedding an optical fiber in said beam; generating and injecting light energy into a first end of said embedded optical fiber;

positioning a photodetector grid array such that the several segments of said array sense different portions of a light beam emanating from a second end of said optical fiber and producing electrical signals identifiable to the amount of light reaching each said segment;

processing said electrical signals into vectors by computing the differences between time related samples and associating therewith a direction;

positioning a light beam splitter operative to sample said emanating light beam; and monitoring said light beam sample to provide a visual representation of the impingement pattern of said light beam upon said grid array.

8. A method for measuring beam motion as claimed in claim 7 wherein said impingement pattern is monitored using a charge coupled device to convert said light beam sample into electrical signals and an optoelectronic device to monitor said impingement pattern.

9. A method for measuring beam motion as claimed in claim 8 wherein the number of segments in said photodetector is four.

10. A method for measuring motion of diverse points of a beam, comprising:

embedding a plurality of optical fibers in said beam;

generating and injecting light energy into a first end of each said embedded optical fiber;

positioning a photodetector grid array such that the several segments of each said array sense different portions of a light beam emanating from a second end of each said optical fiber and producing electrical signals identifiable to the amount of light reaching each said segment;

positioning a light beam splitter operative to sample each said emanating light beam;

monitoring each said light beam sample to provide a visual representation of the impingement pattern of said light beam upon said grid array associated therewith; and processing said electrical signals into vectors by computing the differences between time related samples and associating therewith a direction such that relative motion magnitude and direction are determined.

11. A method for measuring beam motion as claimed in claim 10 wherein said impingement pattern is monitored using a charge coupled device to convert said light beam sample into electrical signals and an optoelectronic device to diplay said electrical signals.

12. A method for measuring beam motion as claimed in claim 11 wherein the number of segments in each said photodetector is four.

13. An apparatus as claimed in claim 1 or 4 wherein each light beam exiting said second end of each said optical fiber is collimated.

14. An apparatus as claimed in claim 7 or 10 wherein each light beam exiting said second end of each said optical fiber is collimated.

* * * * *